United States Patent [19]

Hsu

[11] Patent Number: 5,293,679
[45] Date of Patent: Mar. 15, 1994

[54] METHOD OF CONNECTING TWO PIPES

[76] Inventor: Tzu S. Hsu, 475-1, Kao Mei Rd., Ching Shui, Tai Chung Hsien, Taiwan

[21] Appl. No.: 43,737

[22] Filed: Apr. 7, 1993

[51] Int. Cl.$^5$ .................. B21D 39/04; F16L 13/14
[52] U.S. Cl. .......................... 29/523; 29/423; 29/507; 285/382.4; 285/382.7
[58] Field of Search .............. 29/423, 507, 522.1, 29/523; 285/332.3, 334.1, 382.4, 382.5, 382.7

[56] References Cited

U.S. PATENT DOCUMENTS

| | | | |
|---|---|---|---|
| 3,432,916 | 3/1969 | Fisher et al. | 29/523 X |
| 3,534,988 | 10/1970 | Lindsey | 285/382.7 X |
| 4,109,365 | 8/1978 | Tygart | 29/523 X |
| 5,031,301 | 7/1991 | Oetiker | 29/507 |

FOREIGN PATENT DOCUMENTS

| | | | |
|---|---|---|---|
| 2814433 | 10/1978 | Fed. Rep. of Germany | 29/523 |
| 2074914 | 11/1981 | United Kingdom | 29/523 |

Primary Examiner—Mark Rosenbaum
Assistant Examiner—S. Thomas Hughes
Attorney, Agent, or Firm—Morton J. Rosenberg; David I. Klein

[57] ABSTRACT

A method of connecting two pipes is provided. The method includes the steps of inserting a first pipe into a die and the smaller end of an intermediate tubular member into a neck portion of a second pipe. Next, the intermediate tubular member together with the second pipe are inserted into the first pipe, with its larger end bearing against a shoulder of the first pipe. The neck portion of the second pipe is pressed into the space between the intermediate tubular member and the first pipe. Then, a plastic rod is inserted into the intermediate tubular member and pressed. The plastic rod thereby forces the intermediate tubular member and the neck portion of the second pipe to conform with the cavities of the first pipe. Lastly, the plastic rod is withdrawn from the intermediate tubular member and the die is removed from the first pipe. The two pipes are thereby firmly and rapidly connected together.

2 Claims, 2 Drawing Sheets

METHOD OF CONNECTING TWO PIPES

BACKGROUND OF THE INVENTION

It has been found that the prior art methods of connecting two pipes are typically achieved by welding, screwing, gluing, or press-fitting. However, none of the above-mentioned methods can firmly and rapidly join two pipes together.

Therefore, it is an object of the present invention to provide an improved method of connecting two pipes which may obviate and mitigate the above-mentioned drawbacks.

SUMMARY OF THE INVENTION

This invention relates to an improved method of connecting two pipes.

It is the primary object of the present invention to provide a method of connecting two pipes which may firmly join two pipes together.

It is another object of the present invention to provide a method of connecting two pipes which may rapidly join together two pipes.

It is still another object of the present invention to provide a method of connecting two pipes which is easy to carry out.

It is still another object of the present invention to provide a method of connecting two pipes which is fit for use with various pipes.

It is a further object of the present invention to provide a method of connecting two pipes which is suitable for mass production.

These and other objects of the invention will become apparent from the following detailed description when considered in connection with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
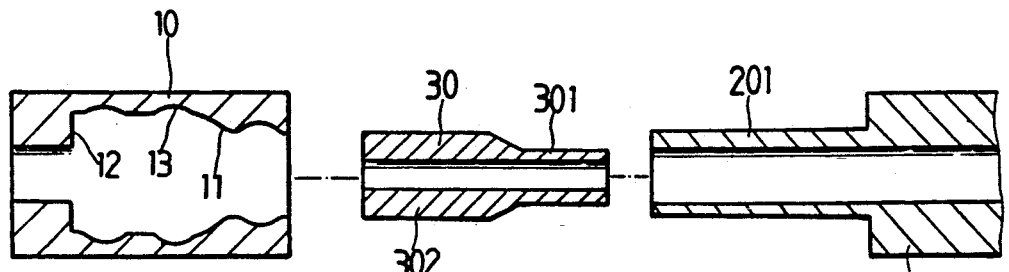
FIG. 1 shows the first step of a method of connecting two pipes according to the present invention.
Figure 2:
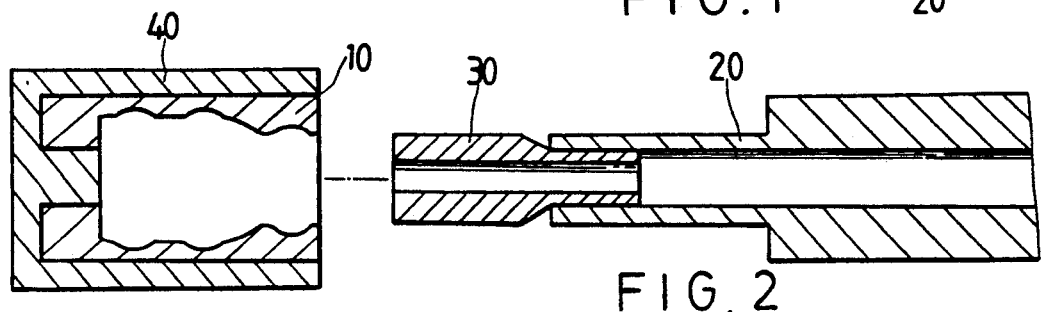
FIG. 2 shows the second step of the present invention.
Figure 3:
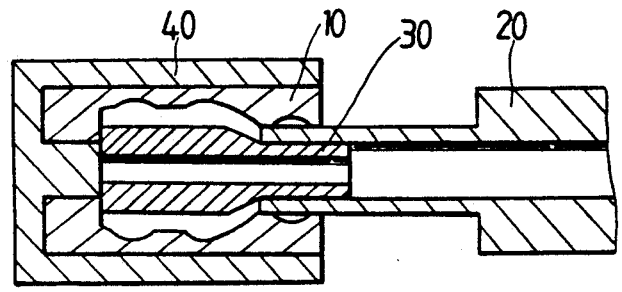
FIG. 3 shows the third step of the present invention.
Figure 4:
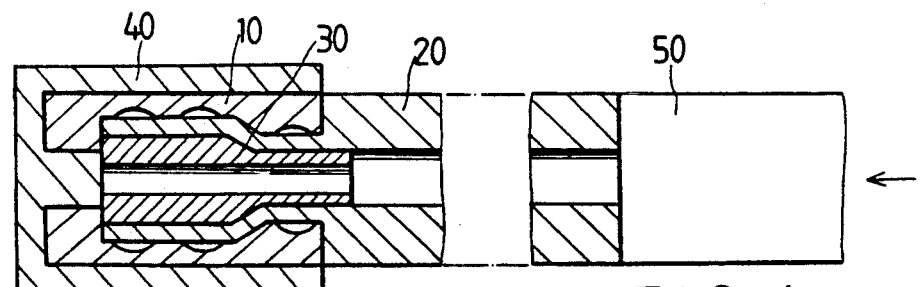
FIG. 4 shows the fourth step of the present invention.
Figure 5:
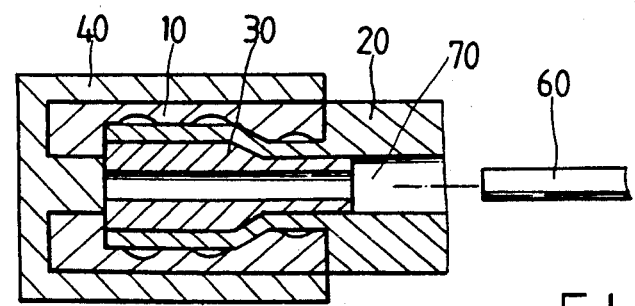
FIG. 5 shows the fifth step of the present invention.
Figure 6:
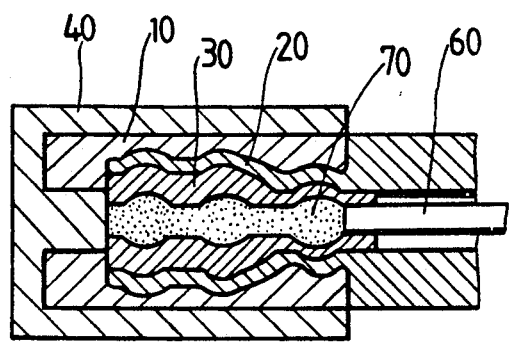
FIG. 6 shows the sixth step of the present invention.
Figure 7:
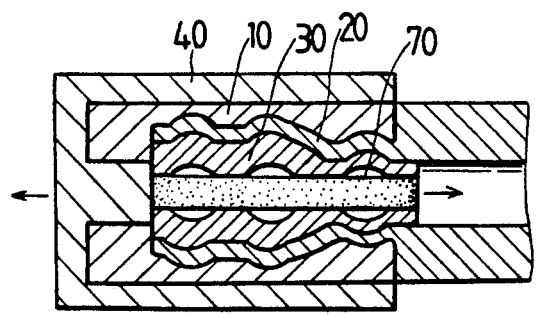
FIG. 7 shows the seventh step of the present invention.
Figure 8:
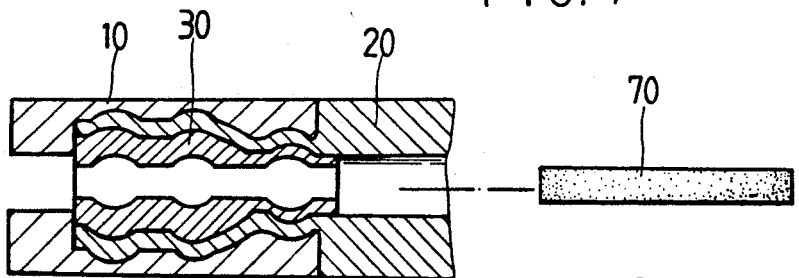
FIG. 8 shows the eighth step of the present invention.
Figure 9:
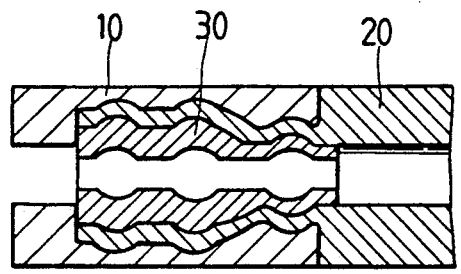
FIG. 9 shows the ninth step of the present invention.

With reference to the drawings and in particular to FIG. 1 thereof, the present invention is designed to connect a first pipe 10 to a second pipe 20. The first pipe 10 is formed with a shoulder 12, a plurality of cavities 13, and a conical surface 11, while the second pipe 20 has a neck portion 201. The smaller end 301 of an intermediate tubular member 30 is inserted into the neck portion 201 of the second pipe 20, and the first pipe 10 is disposed within a die 40 (see FIG. 2). The outer diameter of the smaller end 301 of the intermediate tubular member 30 is just equal to the inner diameter of the neck portion 201 of the second pipe 20, while the outer diameter of the larger end 302 of the intermediate tubular member 30 is just equal to the outer diameter of the neck portion 201 of the second pipe 20. Then, the intermediate tubular member 30 together with the second pipe 20 is inserted into the first pipe 10, with larger end 302 bearing against the shoulder 12 of the first pipe 10 (see FIG. 3). Thereafter, a hydraulic rod 50 is actuated to press the neck portion 201 of the second pipe 20 into the space between the intermediate tubular member 30 and the first pipe 10 (see FIG. 4). Afterwards, a plastic rod 70 is inserted into the intermediate tubular member 30 (see FIG. 5). Then, another hydraulic rod 60 is actuated to press the plastic rod 70 thereby forcing the intermediate tubular member 30 and the neck portion 201 of the second pipe 20 to conform with cavities of the first pipe 10 (see FIG. 6). Thereafter, the plastic rod 70 is withdrawn from the intermediate tubular member 30 and the die 40 is removed from the first pipe 10 (see FIGS. 7, 8 and 9). In the meantime, the first pipe 10 and the second pipe 20 are firmly connected together.

Although the present invention has been described with a certain degree of particularity, it is understood that the present invention disclosure is made by way of example only and that numerous changes in the detail of construction and the combination and arrangement of parts may be resorted to without departing from the spirit and scope of the invention as is hereinafter claimed.

I claim:

1. A method of connecting a first pipe to a second pipe, comprising the steps of:
    a. positioning said first pipe within a die;
    b. providing an intermediate tubular member having (1) a first end with an outside diameter substantially equal to an inside diameter of said second pipe, and (2) a second end of having an outside diameter substantially equal to an outside diameter of a neck portion formed on at least one end of said second pipe;
    c. inserting said first end of said intermediate tubular member into said neck portion of said second pipe;
    d. inserting said intermediate tubular member and at least a portion of said neck portion of said second pipe into a first bore formed in said first pipe member, said first bore being defined by a tubular wall of said first pipe, said second end of said intermediate member being disposed adjacent a shoulder portion of said first pipe within said first bore;
    e. pressing said neck portion of said second pipe into a space disposed between an external surface of said intermediate tubular member and an internal surface of said tubular wall of said first pipe;
    f. inserting a plastic rod within a second bore formed in said intermediate tubular member;
    g. exerting an axial pressure against said plastic rod for radially displacing respective portions of said intermediate tubular member and said neck portion of said second pipe into cavities formed in said internal surface of said tubular wall of said first pipe; and, h. removing said plastic rod from said intermediate tubular member and removing said die from said first pipe.

2. The method as recited in claim 1, wherein the step of positioning said first pipe within a die is preceded by the step of providing said first pipe with at least one end having said internal surface of said tubular wall formed with a conical contour extending from said shoulder portion.

* * * * *